(12) United States Patent
Fukusaka

(10) Patent No.: US 6,795,160 B2
(45) Date of Patent: Sep. 21, 2004

(54) IMAGE READING APPARATUS AND IMAGE READING METHOD

(75) Inventor: Tetsuro Fukusaka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/463,400

(22) Filed: Jun. 18, 2003

(65) Prior Publication Data

US 2004/0001187 A1 Jan. 1, 2004

(30) Foreign Application Priority Data

Jul. 1, 2002 (JP) ........................................ 2002-192174

(51) Int. Cl.[7] .............................................. G03B 27/32
(52) U.S. Cl. .......................................... 355/26; 355/23
(58) Field of Search ............................. 355/23–29, 40, 355/407; 358/474, 497, 498; 399/82, 84, 374; 271/4.7

(56) References Cited

U.S. PATENT DOCUMENTS 5,257,064 A * 10/1993 Okamoto ..................... 355/24
5,568,573 A * 10/1996 Wada et al. ................. 382/317
6,188,468 B1 * 2/2001 Miyajima .................... 355/407

FOREIGN PATENT DOCUMENTS

| JP | 3-240361 | 10/1991 |
| JP | 4-302260 | 10/1992 |
| JP | 9-46484 | 2/1997 |

* cited by examiner

*Primary Examiner*—Henry Hung Nguyen
(74) *Attorney, Agent, or Firm*—Fitzpatrick, Cella, Harper & Scinto

(57) ABSTRACT

An image reading apparatus having an original sheet feeding portion and an image reading portion includes two reading sensors which read an image (top surface and back surface) of an original and can almost simultaneously read both sides of the original without a reversing mechanism. In the image reading apparatus, when an instruction for starting reading is implemented without selecting a single-side reading mode or a both-side reading mode of the original, the reading of the both sides is executed for a first original. In the case that the first original is determined to be the both-side original, the both-side reading mode is still executed. In the case that the first original is determined to be the single-side original, the single-side reading mode is executed.

14 Claims, 4 Drawing Sheets

IMAGE READING APPARATUS AND IMAGE READING METHOD

BACKGROUND OF THE INVENTION

1. Field of the Invention

The present invention relates to an image reading apparatus which is applicable to an image forming apparatus such as a scanner, a copying machine, and a facsimile (FAX), particularly relates to an image reading apparatus and an image reading method, which simultaneously read images on both sides of an original by the use of two reading means.

2. Related Background Art

In an image reading portion (reader portion) of the conventional image forming apparatus such as the copying machine, an image reading apparatus of the reducing optical system, which comprises four components of a carriage storing a light source for illuminating an original from a lower side of a copy board glass, a light reflector for condensing a light beam of the light source onto the original, and a mirror, a carriage for storing two mirrors reflecting the light beam reflected on the above-described mirror toward a predetermined direction, a lens for condensing the reflected light beam or the projected light beam from the original, which is reflected with the two mirrors, and a CCD sensor for receiving the reflected light beam or the projected light from the original, which is condensed with the above-described lens, or the image reading apparatus using single reading sensor such as an image reading apparatus of an one-power optical system which utilizes an LED array light source, a rod lens array, and a Contact Image Sensor (CIS) to read the image in intimate contact with the original is used.

In these image reading apparatuses, in the case that the images on both sides of the original are read, a top surface and a back surface of the both-side original are alternately read by the use of means for reversing an original such as a Document Feeder (DF). However, recently an image reading apparatus having a mechanism which simultaneously reads the both sides has been proposed as shown in FIG. 5.

FIG. 5 is a sectional view showing a schematic structure of the image reading apparatus, and mainly shows a reading position of the both sides of the original and a layout of a conveying path. In FIG. 5, reference numeral 101 indicates a CCD sensor, 102 indicates CIS, 103 indicates a reference white plate, 104 indicates a white sheet, and 105 indicates a copy board, respectively.

The image reading apparatus having the above-described structure includes a first reading sensor (CCD sensor 101) for reading a top surface (first plane) of the original and a second reading sensor (CIS 102) for reading a back surface (second plane) of the same original, and has the mechanism in which the both sides of the original are read in one time conveyance with the first reading sensor and the second reading sensor in course of the conveyance of the original put on the copy board 105 to a discharge side.

However, since original scanning speed of the one-power optical system with CIS is generally slower than the scanning speed of the reducing optical system with the CCD sensor, in the mechanism which reads the both sides by the use of the above-described paper feeding, the scanning speed of the reducing optical system with the CCD sensor is reduced to the scanning speed of the one-power optical system with CIS, the scanning speed of the reducing optical system matches to that of the one-power optical system, and the images on both sides of the original must be simultaneously read.

Accordingly, in the case that the scanning speed of the optical system with the CCD sensor and that of the optical system with CIS are equally set, even in the case that the single-side image original is read with the reducing optical system with the CCD sensor, there is a problem that the original must be scanned at scanning speed of the one-power optical system with CIS, which is slower than the performance of the reducing optical system with the CCD sensor.

In view of the foregoing problem, the present invention is directed at providing an image reading apparatus with high productivity, a control method thereof, and an image forming apparatus, in which the image reading can be performed at optimum original scanning speed in the both-side reading and the single-side reading and the image reading can be performed at optimum original scanning speed even if the image reading apparatus reads the original which is not specified whether the original is the single-side image or the both-side image.

SUMMARY OF THE INVENTION

It is an object of the present invention is to provide an image reading apparatus including conveying means which conveys an original to a first reading position and a second reading position, first reading means which reads a first surface of the original at the first reading position while the original is conveyed with the conveying means, second reading means which reads a second surface of the original at the second reading position while the original is conveyed with the conveying means, a first reading mode which reads a single side of the original to be conveyed with the conveying means with the first reading means, a second reading mode which reads both sides of the original to be conveyed with the conveying means with the first reading means and the second reading means, setting means which sets the first reading mode or the second reading mode, and control means which controls to read the both sides of the original for a first original in the case that the first reading mode or the second reading mode is not set with the setting means, to read the single side of the original for second and subsequent originals in the case that an image of the first original is in the singe side, and to read the both sides of the original for the second and subsequent originals in the case that the image of the first original is in the both sides.

Another object of the present invention is to provide an image reading apparatus wherein a first original conveying speed in the first reading mode is faster than a second original conveying speed in the second reading mode.

A further object of the present invention is to provide an image reading apparatus wherein the first reading means includes an image reading unit of a reducing optical system and the second reading means includes an image reading unit of a one-power optical system.

A further object of the present invention is to provide an image reading apparatus wherein the first reading means and the second reading means include the image reading unit of the one-power optical system.

A further object of the present invention is to provide an image reading apparatus including conveying means which conveys an original to a first reading position and a second reading position, first reading means which reads a first surface of the original at the first reading position while the original is conveyed with the conveying means, second reading means which reads a second surface of the original at the second reading position while the original is conveyed with the conveying means, a first reading mode which reads a single side of the original to be conveyed with the conveying means with the first reading means, a second reading mode which reads both sides of the original to be conveyed with the conveying means with the first reading means and the second reading means, setting means which sets the first reading mode or the second reading mode, and control means which controls to read the both sides of the original for a first original in the case that the first reading mode or the second reading mode is not set with the setting means.

A further object of the present invention is to provide an image reading apparatus including a first original conveying speed in the first reading mode is faster than a second original conveying speed in the second reading mode., A further object of the present invention is to provide an image reading apparatus including the first reading means includes an image reading unit of a reducing optical system and the second reading means includes an image reading unit of a one-power optical system.

A further object of the present invention is to provide an image reading apparatus including the first reading means and the second reading means include the image reading unit of the one-power optical system.

A further object of the present invention is to provide an image reading apparatus including conveying means which conveys an original, a first reading mode which reads a single side of the original which is conveyed with the conveying means, a second reading mode which reads both sides of the original to be conveyed with the conveying means, setting means which sets the first reading mode or the second reading mode, and control means which controls to read the both sides of the original for a first original in the case that the first reading mode or the second reading mode is not set with the setting means, to read the single side of the original for second and subsequent originals in the case that an image of the first original is in the singe side, and to read the both sides of the original for the second and subsequent originals in the case that the image of the first original is in the both sides.

A still further object of the present invention is to provide an image reading apparatus including the steps of setting a first reading mode for reading a single side of an original or a second reading mode for reading both sides of the original, starting the reading of the original, conveying a plurality of originals one by one on the basis of instruction by the starting step, and reading the both sides of the original for a first original in the case that the first reading mode or the second reading mode is not set with the setting step, reading the single side of the original for second and subsequent originals in the case that an image of the first original is in the singe side, and reading the both sides of the original for the second and subsequent originals in the case that the image of the first original is in the both sides.

Other objects and features of the present invention will become apparent from the following description and drawings.

DETAILED DESCRIPTION OF THE PREFERRED EMBODIMENTS

Preferred embodiments of the invention will be described below referring to the accompanying drawings.

Figure 1:
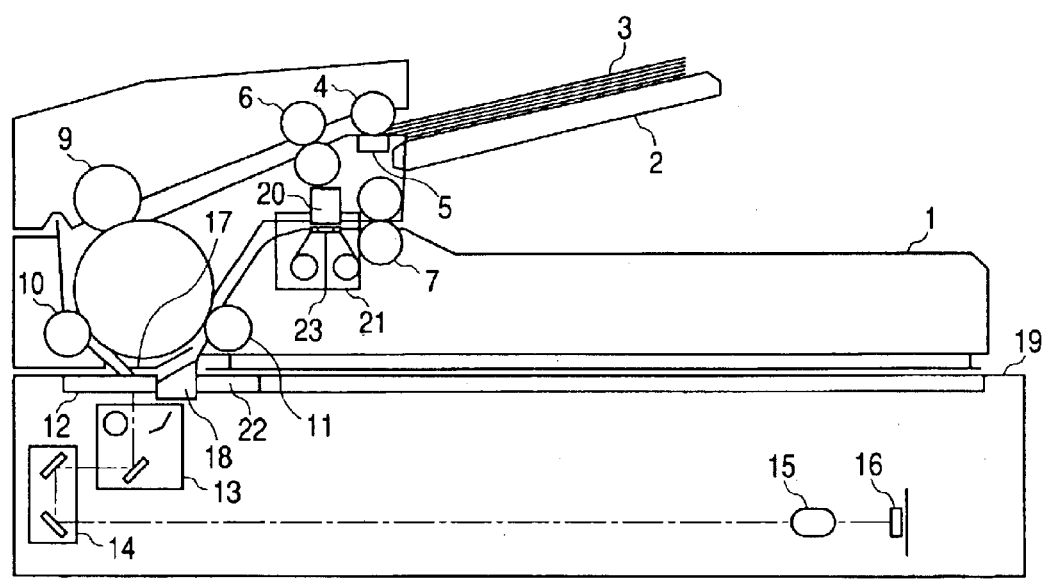
FIG. 1 is a sectional view showing a structure of an image reading apparatus.

FIG. 1 is the sectional view showing the structure of the image reading apparatus, and shows the schematic structure of the image reading apparatus built-in the image forming apparatus such as a copying machine and FAX.

The image reading apparatus shown in FIG. 1 includes an original sheet feeding device 1 and an original reading device 19. The original reading device 19 includes two reading sensors, i.e. first reading means which comprises four components of an exposure portion 13 storing the light source for illuminating the original from the lower side of the copy board glass, the light reflector for condensing the light beam of the light source onto the original, and a mirror, a mirror unit 14 storing two mirrors for reflecting the light beam reflected on the mirror of the exposure portion 13 toward the predetermined direction, a lens 15 for condensing the reflected light beam or the projected light beam from the original, which is reflected with the two mirrors of the mirror unit 14, and a CCD sensor 16 for receiving the reflected light beam or the projected light from the original, which is condensed with the lens 15, and second reading means of the one-power optical system which utilizes the LED array light source, the rod lens array, and a Contact Image Sensor (CIS) to read the image in intimate contact with the original.

The first reading means reads the image of the original while the exposure portion 13 in the original reading device 19 is relatively moved to the original 3, and the second reading means reads the image of the original while a contact image sensor unit 20 is relatively moved to the original 3. Though the contact image sensor unit 20 is not shown, the contact image sensor unit 20 includes the LED array of the light source, a rod lens array, and CIS.

The original 3 set in an original tray 2 is individually fed with an original feeding roller 4 paired with a separating pad 5. The fed original is sent to an inside of the image reading apparatus with an intermediate roller 6, passed to a carrying path which resides further inside with a roller 8 and a first guide roller 9, and conveyed with a second guide roller 10 so as to be along the roller 8.

The original 3 conveyed with the roller 8 and the second guide roller 10 passes through between a skimming copy board glass 12 and an original guide plate 17, and is conveyed again with the roller 8 and a third guide roller 11 through a jump board 18. At this point, between the skimming copy board glass 12 and the original guide plate 17, the original 3 is conveyed with a member of the original guide plate 17 while the original is in contact with the skimming copy board glass 12.

Before the original 3 is conveyed further inside, shading correction processing is performed in reading portions of the first reading means and the second reading means. Specifically, in the correction processing, correction data is made in order to perform the shading correction to the image data of the original, which is read with each reading means. At this point, the first reading portion reads a reference white plate 22 and the second reading portion reads a white sheet 23 in an updating portion 21 of the reference white plate, so that each of a proper white level is obtained.

When the original 3 passes through the skimming copy board glass 12, the surface of the original 3 in contact with the skimming copy board glass 12 is exposed with the exposure portion 13. The exposure portion 13 transmits image information of the original 3 reflected from the original 3 to a mirror unit 14 by exposing the original 3 at a predetermined reading position. The transmitted image information of the original passes through the lens 15, and is condensed to be converted into an electrical signal with the image reading sensor portion (CCD sensor) 16. Then, the original 3 is discharged outside the original sheet feeding device 1 with the discharge roller 7.

The image on the first side (top surface) of the original 3 is read in the above-described process. Further, in the original 3 conveyed with the roller 8 and the third guide roller 11, the image on a second side (back surface) of the original is read at the predetermined reading position with the contact image sensor unit 20 with the original 3 being conveyed in course of the conveyance of the original to the direction of the original discharge roller 7, and then the original 3 is discharged outside the original sheet feeding device 1.

In the image reading apparatus having the above-described structure, the both sides of the original can be read in one time of the conveyance without a mechanism for reversing the original with the first reading means and the second reading means.

Figure 2:
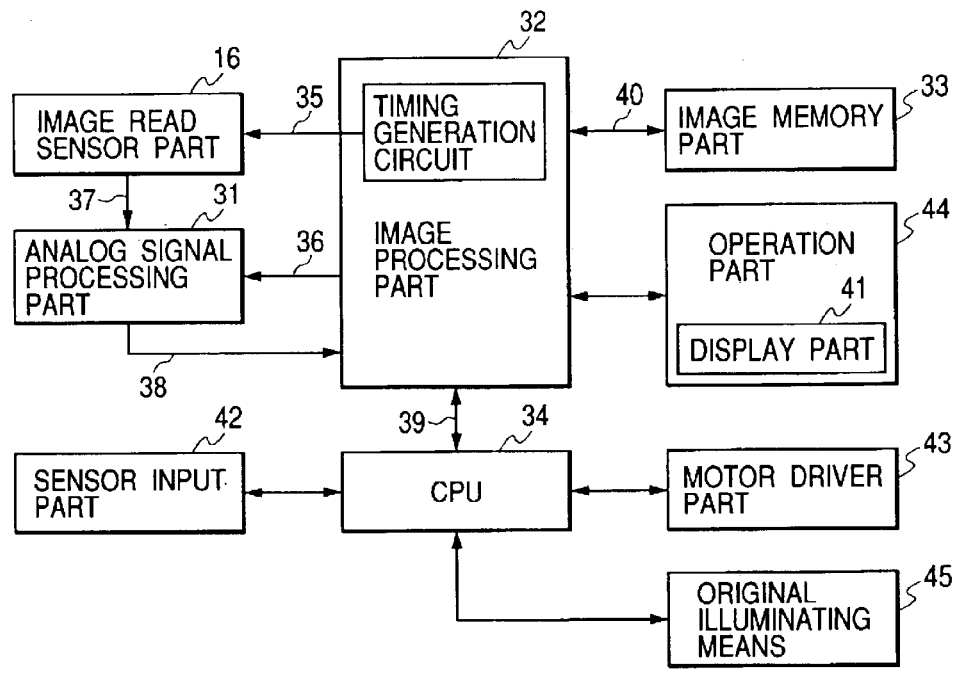
FIG. 2 is a block diagram showing a main functional structure of an image controlling system.

FIG. 2 is the block diagram showing the main functional structure of the image controlling system of the embodiment.

The image reading sensor portion (CCD sensor or CIS) 16 sequentially converts optical information into an analog image signal 37 and outputs the same according to a timing signal 35 generated with a timing generation circuit built-in an image processing portion 32. An analog signal processing portion 31 converts the analog image signal 37 outputted from the image reading sensor portion 16 into a digital image signal 38 according to a timing signal 36 from the image processing portion 32. The digital image signal 38 is inputted to the image processing portion 32, and the processing such as the shading correction is performed in the image processing portion 32. The image processing portion 32 writes in and reads our the image information to and from an image memory portion 33 through a memory I/F (interface) 40.

A CPU 34 controls the whole of the original reading device 19 such as control of the image processing portion 32, the control of a sensor input portion 42, the control of a motor driver portion 43, and the control of original illuminating means 45. Further, the CPU 34 sets or controls the image processing portion 32 and reads and writes the image information through a CPU bass 39, and performs setting instruction of a reading mode and starting instruction of reading action by operation of an operation portion 44. A display portion 41 is provided in the operation portion 44.

Figure 3:
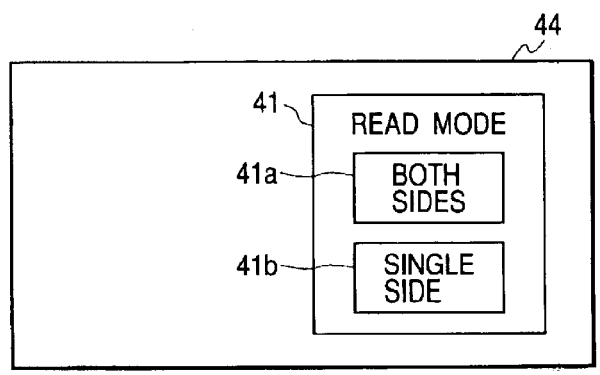
FIG. 3 is a schematic view of a setting screen of a reading mode.

A liquid crystal touch panel is used in the display portion 41 of the operation portion 44, and a user can set the reading mode on the display screen. FIG. 3 is the setting screen of the reading mode which is displayed by a given action of the user. A key 41a for setting a both-side reading mode and a key 41b for setting a single side reading mode are displayed in the setting screen.

In this case, though the liquid crystal touch panel portion of the display portion 41 sets the reading mode, a dedicated button may be provided in the operation portion to perform the setting of the reading mode.

Figure 4:
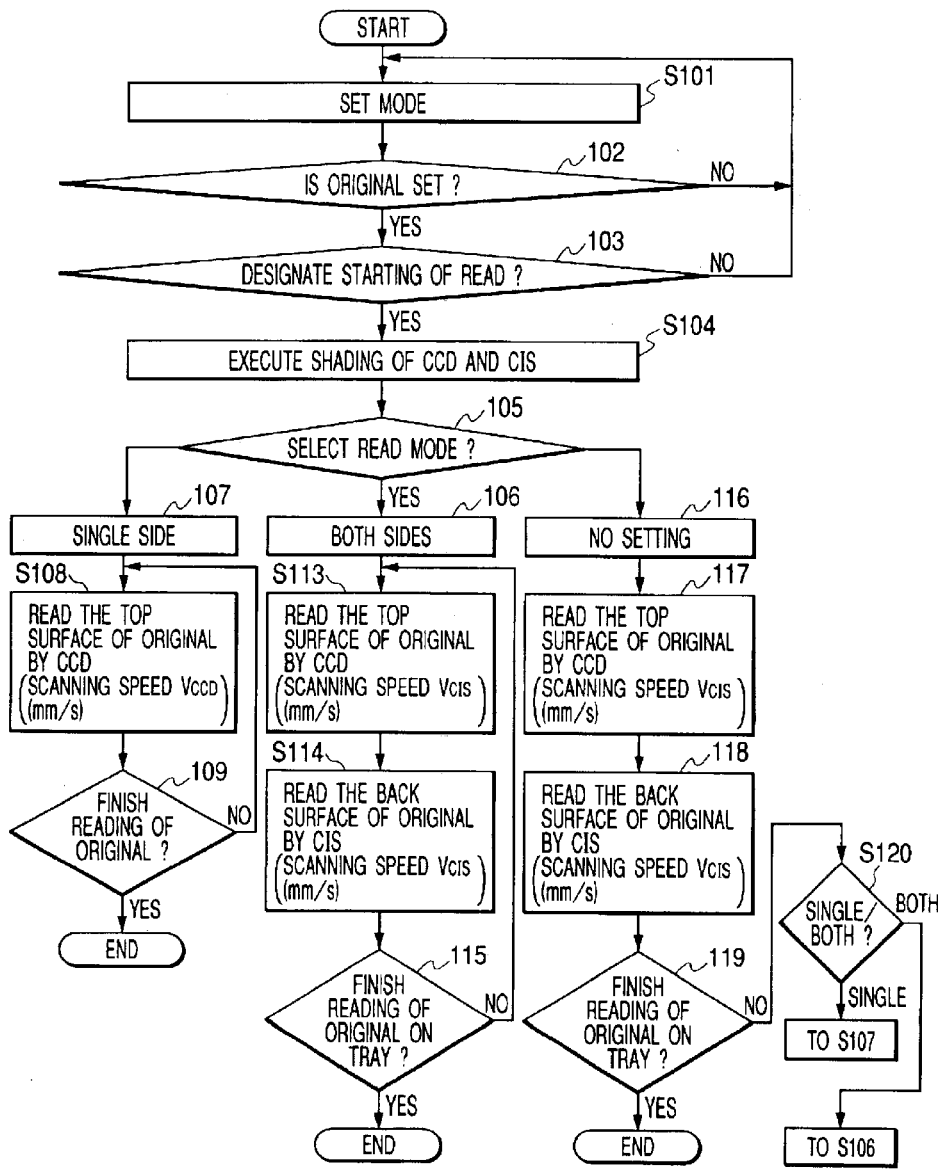
FIG. 4 is a flow chart showing control action which is a feature of the present invention.
Figure 5:
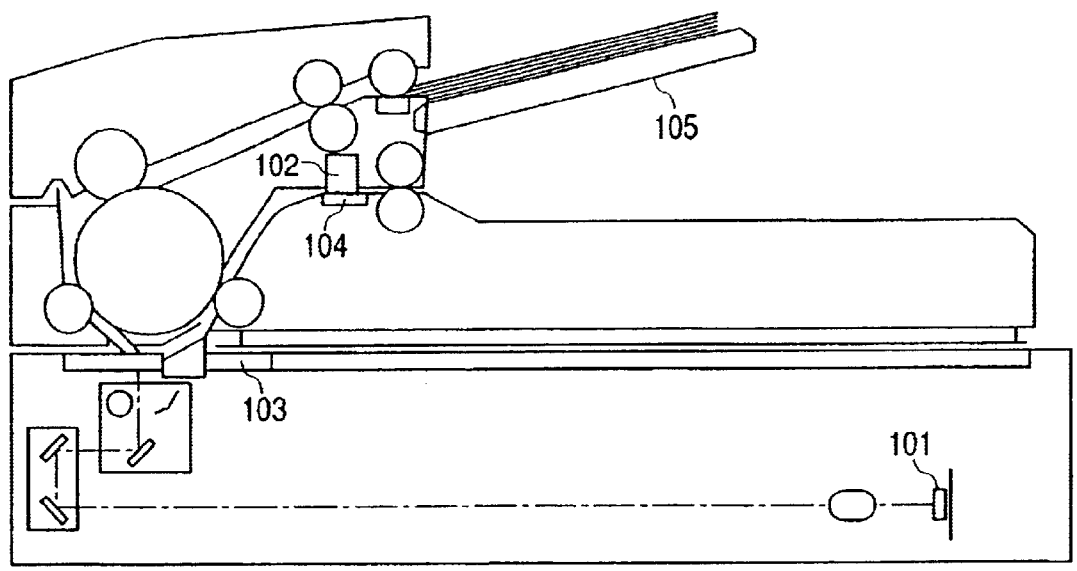
FIG. 5 is a sectional view showing the structure of the image reading apparatus of the related art.

FIG. 4 shows a flow of the actual action. FIG. 4 is the flow chart showing the control action of the embodiment, and the flow chart is executed according to a program previously stored in the CPU 104 in FIG. 2. Incidentally, CIS indicates the Contact Image Sensor.

At first the single side reading mode or the both-side reading mode is set with the operation portion 44 before reading action of the original 3 is started (S101). If the original 3 is set and the starting instruction of the reading action is given (S102 and S103), the shading actions of the CCD sensor which is the first reading means and CIS which is the second reading means are performed (S104). The image reading mode set with the operation portion 44 is checked (S105). In the case that the reading mode is set to the single side reading mode, the flow proceeds to S107. In the case that the reading mode is set to the both-side reading mode, the flow proceeds to S106.

In the case of the both-side reading mode, the original reading device 19 first conveys the sheets of the original 3 with original feeding device 4 individually, and the original reading device 19 reads the top surface of the original 3 with the CCD sensor (S113). Subsequently, when the conveyed original 3 have reached the position of CIS, CIS reads the back surface of the original 3 (S114). After the top surface and back surface of one original are read, if the conveyance of the originals on the original tray 2 is not completed, the conveyance and the reading of the next original 3 are performed (S115). When the reading of the original 3 on the original tray 2 is completed, the both-side reading mode is finished and the image reading apparatus shifts to a usual stand-by mode.

In this case, conveying speed of the original 3 is constant, and scanning speed of the reading with the CCD sensor corresponds to the scanning speed Vcis (mm/sec) of the reading with CIS so as to read the both sides of the original. However, in the case that the scanning speed of the CCD sensor is lowered from the scanning speed VCCD (mm/sec) of the CCD sensor alone, it is necessary that the number of pixels in a sub-scanning direction of the surface image to be read with the CCD sensor is increased by the amount of a decrease in the scanning speed. Accordingly, though there in no illustration, the CCD driver portion is controlled so that the accumulation time of CCD is increased by the amount of a decrease in the scanning speed.

In the case of the single side reading mode, the original reading device 19 first conveys the sheets of the originals with the original feeding device 1 individually, the original sheet feeding device 1 individually conveys the sheets of the original 3 and the original reading device 19 reads the top surface of the original 3 with the CCD sensor (S108). After a sheet of the original 3 is read, if the conveyance of the original on the original tray 2 is not completed, the conveyance and the reading of the next original 3 are performed (S109). When the reading of the originals 3 on the original tray 2 is completed, the both-side reading mode is finished and the image reading apparatus shifts to a usual stand-by mode.

In this case, as compared with the case of the both sides reading of the original, the faster conveyance and reading can be performed in such a manner that the scanning speed VCCD (mm/sec) of the CCD sensor alone, which is faster than the scanning speed of CIS, is adopted as the scanning speed of the reading with the CCD sensor.

In the case that the setting has not been performed by the mode setting in S101 (the both-side images reading mode of the original or the single-side image reading mode has not been set), it is decided that there is no setting in the check of the image reading mode (S105), so that the flow proceeds to S116.

In the case that the reading mode is not set, similar to the both-side reading mode, the original reading device 19 first conveys the sheets of the original 3 with the original feeding device 1 individually, and the original reading device 19 reads the top surface of the original 3 with the CCD sensor (S117). Subsequently, when the conveyed original 3 have reached the position of CIS (reading position), CIS reads the back surface of the original 3 (S118).

After the top surface and back surface of a sheet of the original 3 are read, if the conveyance of the originals 3 on the original tray 2 is not completed (S119), it is decided whether or not the image is present in the back surface from the image information to be read with CIS, i.e. the single-side original or both-side original (S120). In the case that the first original 3 is determined to be the both-side image original, expecting that the second and subsequent originals are also the both-side image original, the flow shifts to S106 and reading action of the both-side reading mode is performed. On the other hand, in the case that the first original 3 is determined to be the single-side image original, expecting that the second and subsequent originals are also the single-side image original, the flow shifts to S107 and reading action of the single-side reading mode is performed.

In the embodiment, the first image reading means includes the reading means of the reducing optical system with the CCD sensor and the second image reading means includes the reading means of the one-power optical system with CIS, respectively. There is a relationship in which V1>V2 when the image scanning speed with the first image reading means alone is set to V1 (mm/sec) and the image scanning speed with the second image reading means alone is set to V2 (mm/sec). The relationship depends on performance of the reading means. Though the reading means of the embodiment has the above-described structure, it may adopt the structure in which CIS is used as both the first image reading means and the second image reading means as a matter of course.

According to the embodiment, in the case of the both-side reading mode, the both-side images of the original can be almost simultaneously read at original scanning speed (process speed) of the one-power optical system with CIS by the use of CIS and the CCD sensor. In the case of the single-side reading mode, the single-side image of the original can be read at scanning speed faster than the both-side reading mode by reading the original with the CCD sensor by the use of the original scanning speed of the reducing optical system with the CCD sensor.

In the case that the original to be read is not specified (not set) whether the original is the single-side images or the both-side image, the reading of the first original is performed at original scanning speed of the one-power optical system with CIS by driving CIS and the CCD sensor. When the first original is the single-side image, the reading of the second and subsequent originals is performed at original scanning speed of the reducing optical system with the CCD sensor by driving the CCD sensor. When the first original is the both-side image, the reading of the second and subsequent originals is still performed at original scanning speed of the one-power optical system with CIS by driving the CCD sensor and CIS.

According to the above-described structure, the image reading can be performed at optimum original scanning speed in the both-side reading mode and the single-side reading mode. Further, the image reading can be performed at optimum original scanning speed even if the image reading apparatus reads the original which is not specified whether the original is the single-side image or the both-side image. Consequently, there can be realized the image reading apparatus, the control method thereof, and the image forming apparatus, in which productivity is high, efficiency is good, and the optimum image reading can be performed.

As described above, according to the present invention, the image reading can be performed at optimum original scanning speed in the both-side reading mode and the single-side reading mode, and the image reading can be performed at optimum original scanning speed and the image reading can be performed with the high productivity and the good efficiency even if the image reading apparatus reads the original which is not specified whether the original is the single-side image or the both-side image.

What is claimed is:

1. An image reading apparatus comprising:
   conveying means for conveying an original to a first reading position and a second reading position;
   first reading means for reading a first surface of the original at the first reading position while the original is conveyed with the conveying means;
   second reading means for reading a second surface of the original at the second reading position while the original is conveyed with the conveying means;
   a first reading mode for reading a single side of the original to be conveyed with the conveying means with the first reading means;
   a second reading mode for reading both sides of the original to be conveyed with the conveying means with the first reading means and the second reading means;
   setting means for setting the first reading mode or the second reading mode; and
   control means for controlling to read the both sides of the original for a first original in the case that the first reading mode or the second reading mode is not set with the setting means, to read the single side of the original for a second and subsequent originals in the case that an image of the first original is in the single side, and to read the both sides of the original for the second and subsequent originals in the case that the image of the first original is in the both sides.

2. An image reading apparatus according to claim 1, wherein a first original conveying speed in the first reading mode is faster than a second original conveying speed in the second reading mode.

3. An image reading apparatus according to claim 2, wherein the first reading means includes an image reading unit of a reducing optical system and the second reading means includes an image reading unit of an one-power optical system.

4. An image reading apparatus according to claim 2, wherein said first reading means and said second reading means include the image reading unit of the one-power optical system.

5. An image reading apparatus comprising:
   conveying means for conveying an original to a first reading position and a second reading position;
   first reading means for reading a first surface of the original at the first reading position while the original is conveyed with said conveying means;
   second reading means for reading a second surface of the original at the second reading position while the original is conveyed with the conveying means;

a first reading mode for reading a single side of the original to be conveyed with the conveying means with the first reading means;

a second reading mode for reading both sides of the original to be conveyed with said conveying means with said first reading means and said second reading means;

setting means for setting the first reading mode or the second reading mode; and control means for controlling to read the both sides of the original for a first original in the case that the first reading mode or the second reading mode is not set with the setting means.

6. An image reading apparatus according to claim 5, wherein a first original conveying speed in the first reading mode is faster than a second original conveying speed in the second reading mode.

7. An image reading apparatus according to claim 6, wherein said first reading means includes an image reading unit of a reducing optical system and the second reading means includes an image reading unit of an one-power optical system.

8. An image reading apparatus according to claim 6, wherein said first reading means and said second reading means include the image reading unit of the one-power optical system.

9. An image reading apparatus comprising:

conveying means for conveying an original;

a first reading mode for reading a single side of the original to be conveyed with said conveying means;

a second reading mode for reading both sides of the original to be conveyed with said conveying means;

setting means for setting said first reading mode or said second reading mode; and control means for controlling to read the both sides of the original for a first original in the case that said first reading mode or said second reading mode is not set with the setting means, to read the single side of the original for second and subsequent originals in the case that an image of the first original is in the single side, and to read the both sides of the original for the second and subsequent originals in the case that the image of the first original is in the both sides.

10. An image reading method, comprising the steps of:

setting a first reading mode for reading a single side of an original or a second reading mode for reading both sides of the original;

starting the reading of the original;

conveying a plurality of originals one by one on the basis of instruction by the starting step; and reading the both sides of the original for a first original in the case that said first reading mode or said second reading mode is not set with the setting step, reading the single side of the original for second and subsequent originals in the case that an image of the first original is in the single side, and reading the both sides of the original for the second and subsequent originals in the case that the image of the first original is in the both sides.

11. An image reading apparatus comprising:

a conveyer that conveys an original to a first reading position and a second reading position;

a first reading device that reads a first surface of the original at the first reading position while the original is conveyed with the conveyer;

a second reading device that reads a second surface of the original at the second reading position while the original is conveyed with the conveyer;

a setting device that sets a first reading mode for reading a single side of the original to be conveyed with the conveyer with the first reading device or a second reading mode for reading both sides of the original to be conveyed with the conveyer with the first reading device and the second reading device; and a controller that controls to read the both sides of the original for a first original in the case that the first reading mode or the second reading mode is not set with the setting device.

12. An image reading apparatus comprising:

a conveyer that conveys an original;

a setting device that sets a first reading mode for reading a single side of the original or a second reading mode for reading both sides of the original; and a controller that controls to read the both sides of the original for a first original in the case that said first reading mode or said second reading mode is not set with the setting device, to read the single side of the original for second and subsequent originals in the case that an image of the first original is in the single side, and to read the both sides of the original for the second and subsequent originals in the case that the image of the first original is in the both sides.

13. An image reading apparatus comprising:

a conveyer that conveys an original to a first reading position and a second reading position;

a first reading device that reads a first surface of the original at the first reading position while the original is conveyed with the conveyer;

a second reading device that reads a second surface of the original at the second position while the original is conveyed with the conveyer; and a controller that controls to read the both sides of the original for a first original in the case that a first reading mode for reading a single side of the original to be conveyed with the conveyer with the first reading device or a second reading mode for reading both sides of the original to be conveyed with the conveyer with the first reading device and the second reading device is not set.

14. An image reading apparatus comprising:

a conveyer that conveys an original; and a controller that controls to read the both sides of the original for a first original in the case that a first reading mode for reading a single side of the original or a second reading mode for reading both sides of the original is not set, to read the single side of the original for second and subsequent originals in the case that an image of the first original is in the single side, and to read the both sides of the original for the second and subsequent originals in the case that the image of the first original is in the both sides.

* * * * *

UNITED STATES PATENT AND TRADEMARK OFFICE
CERTIFICATE OF CORRECTION

PATENT NO.  : 6,795,160 B2
DATED       : September 21, 2004
INVENTOR(S) : Tetsuro Fukusaka It is certified that error appears in the above-identified patent and that said Letters Patent is hereby corrected as shown below:

Column 1,
Line 31, "an" ($2^{nd}$ occurrence) should read -- a --.
Line 36, "the" ($2^{nd}$ occurrence) should be deleted.

Column 2,
Line 1, "to" should be deleted.
Line 24, "is" ($2^{nd}$ occurrence) should be deleted.
Line 44, "singe" should read -- single --.

Column 3,
Line 15, "mode" should read -- mode which --.
Lines 19 and 20, "includes" should read -- which includes --.
Line 24, "include" should read -- which include --.
Lines 38 and 53, "singe" should read -- single --.

Column 4,
Line 12, "built-in" should read -- built in --.

Column 5,
Line 43, "our" should read -- out --.

Column 6,
Line 23, "have" should read -- has --.
Line 40, "is" should read -- be --.
Line 41, "in" ($2^{nd}$ occurrence) should read -- is --.

Column 7,
Line 9, "have" should read -- has --.

Column 8,
Line 52, "an" ($2^{nd}$ occurrence) should read -- a --.

UNITED STATES PATENT AND TRADEMARK OFFICE
CERTIFICATE OF CORRECTION

PATENT NO. : 6,795,160 B2
DATED : September 21, 2004
INVENTOR(S) : Tetsuro Fukusaka It is certified that error appears in the above-identified patent and that said Letters Patent is hereby corrected as shown below:

Column 9,
Line 21, "an" (2nd occurrence) should read -- a --.

Signed and Sealed this

Eleventh Day of January, 2005

JON W. DUDAS
*Director of the United States Patent and Trademark Office*